(12) United States Patent
Rochlin et al.

(10) Patent No.: US 7,255,917 B2
(45) Date of Patent: Aug. 14, 2007

(54) RETICULATED OPEN CELL FILLING MATERIAL

(76) Inventors: Scott Rochlin, 321 Bellevue Way SE. #506, Bellevue, WA (US) 98004; Rubin Rochlin, deceased, late of Bellevue, WA (US); by Mike Rochlin, legal representative, 10052 116th Ave NE., Kirkland, WA (US) 98033

( * ) Notice: Subject to any disclaimer, the term of this patent is extended or adjusted under 35 U.S.C. 154(b) by 0 days.

(21) Appl. No.: 10/949,007

(22) Filed: Sep. 24, 2004

(65) Prior Publication Data

US 2005/0123736 A1    Jun. 9, 2005

Related U.S. Application Data

(60) Provisional application No. 60/506,239, filed on Sep. 25, 2003.

(51) Int. Cl.
*B32B 3/26* (2006.01)
(52) U.S. Cl. ............... 428/304.4; 428/315.7; 428/316.6; 5/636; 5/637; 5/638; 5/953; 5/655.9
(58) Field of Classification Search .............. 5/953, 5/655.9
See application file for complete search history.

(56) References Cited

U.S. PATENT DOCUMENTS

| 3,171,820 A | * | 3/1965 | Volz ....................... 521/61 |
| 3,761,131 A |   | 9/1973 | Oliver |
| 3,900,648 A |   | 8/1975 | Smith |
| 4,060,863 A |   | 12/1977 | Craig |
| 4,862,539 A |   | 9/1989 | Bokich |
| 4,924,541 A |   | 5/1990 | Inagaki |
| 5,228,158 A |   | 7/1993 | Park |
| 5,797,154 A |   | 8/1998 | Contreras |
| 5,839,138 A |   | 11/1998 | Weidman et al. |

* cited by examiner

*Primary Examiner*—Elizabeth M. Cole
*Assistant Examiner*—Anish P. Desai
(74) *Attorney, Agent, or Firm*—Michael F. Hughes; Hughes Law Firm, PLLC

(57) ABSTRACT

Flexible filtering filling material consisting of pieces that are 100% open cell reticulated polyurethane foam. The pieces filter out the damp warm condition within the filling, haltering the proliferation of microorganisms, giving the product a more sanitary and longer life.

9 Claims, 5 Drawing Sheets

RETICULATED OPEN CELL FILLING MATERIAL

RELATED APPLICATIONS

This application claims priority benefit of U.S. Ser. No. 10/015,452, filed Dec. 11, 2001, and U.S. Ser. No. 60/506,239, filed Sep. 25, 2003.

BACKGROUND a) Field of the Invention

The present invention generally pertains to a filling material that supports and gives comfort to the human body while allowing the warmth and moisture to freely filter out.

Darkness, dampness and warmth are key ingredients for the proliferation of bacteria, dust mites, and fungus. It is the combination of these factors that contributes to the growth of these unwanted organisms. Therefore, removal of any one of these factors facilitates the prevention of unwanted organisms that can cause health problems and discomfort.

b) Background Art

In the known prior art of various types of pillows, mattress pads, outer garments, comforters, etc., for supporting and giving comfort to the human body, the filling materials used in these products (particularly down, feathers, synthetic fibers and regular polyurethane foam) have certain disadvantages. They absorb moisture and warmth from the human body without a means for the damp warm condition to readily dissipate. This condition provides an unsatisfactory environment, which will proliferate the growth of mites and bacteria. The same pillow used by various persons in hotels, hospitals, or airplanes could become unsanitary in short order.

Mites and bacteria found in the filling material of bedding products are industry problems. Manufacturers add anti-bacterial chemicals to the filling or are covering the filling, such as pillows, with mite and bacteria resistant covers as the solution. While these solutions may help somewhat, scientists claim the anti-bacterial chemicals form more resistant microorganisms.

Another problem with filling materials is that it is often difficult to wash them thoroughly. Some filling materials cannot be washed thoroughly. Down, for example, requires commercial cleaning to be thoroughly sanitized, which can be costly.

SUMMARY OF THE INVENTION

The present invention is a filling material for products with micro thin coverings and direct contact to the human body such as pillows, pads, outer garments, etc. The filling material filters out the warmth and dampness, which is normally stagnant in most filling materials.

The material used in the invention is a 100% open cell reticulated polyurethane foam. The foam has no cell windows (walls), allowing unrestricted air passage. It maintains a greater than 90% void space even when compressed to one tenth of its original volume. This foam filler material is formed of small similar or random shaped pieces. The objective is to allow air to readily filter out of the warm and damp condition. The small pieces provide the necessary flexibility for comfort, together with the required means of filtering. This filtering eliminates the warm and damp condition that is normally stagnant in the filling material. This new material becomes an "air filtering filling material" with applications for products using regular polyurethane foam, down, feather, Dacron, polyester fibers and other.

DETAILED DESCRIPTION OF THE INVENTION

The air filtering filling material of the invention will be used for cushioning and increasing the comfort of products with micro thin coverings (such as bed pillows) for the human body, while allowing warmth and dampness to freely filter out. The material used for the invention is a 100% open cell reticulated polyurethane foam. This foam is essential to the invention because in its manufactured state it has 97% void space for high breatheability, which allows for the free transferring of air. The foam pieces continue to have a void volume of over 90% while under compression to $\frac{1}{3}^{rd}$ of the original volume's size. Even when this foam is compressed to a tenth of its original volume, it still maintains a high degree of void space (over 90%). This becomes essential with the intended use of this product in bed pillows and garments because of the constant compression of the product in normal everyday usage. If air cannot flow freely because of matting or being trapped, it will not maintain a dryer platform to inhibit the growth of microorganisms such as bacteria and mites. Additionally, depending upon the reticulation method used, the strength and softness of the fibers can be controlled to a greater degree than regular polyurethane foam.

A second factor of bacteria control is the transferability of air throughout the composition of material. This allows for heat transfer which is quickly dissipated from a body part that is in contact with the outer surface of a pillow or cushion. Further, the 100% open cell structure allows free transfer of air (even while substantially compressed) allowing convection currents to pass therethrough. This is particularly useful in removing moisture that can get trapped within a pillow or cushion. The removal of moisture is beneficial to inhibiting the growth of unwanted organisms.

Figure 1:
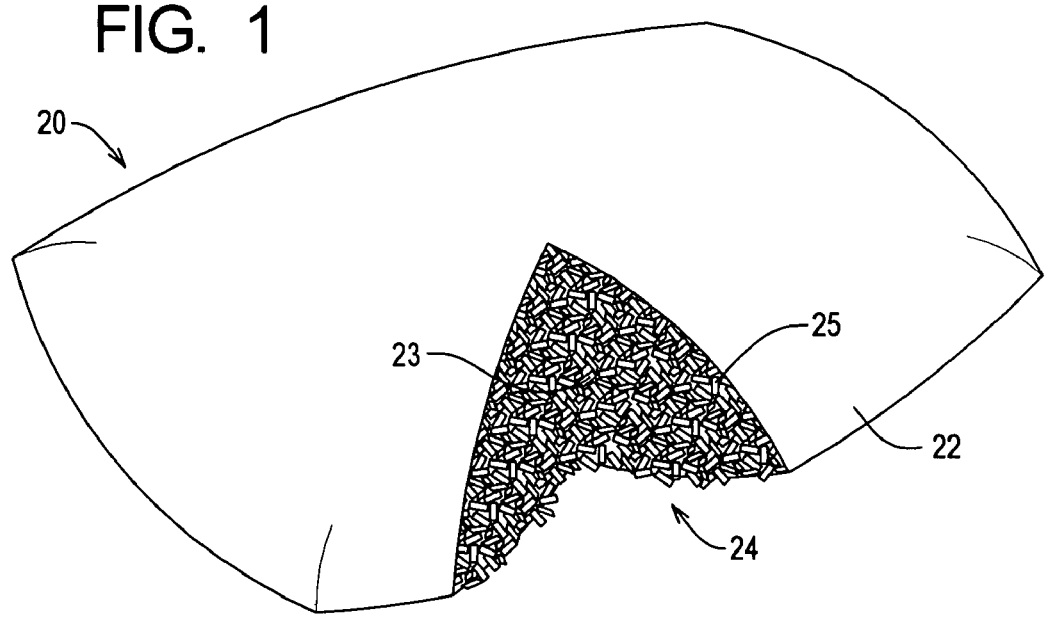
FIG. 1 is a partial sectional view of a pillow showing the filling material contained therein.
Figure 9:
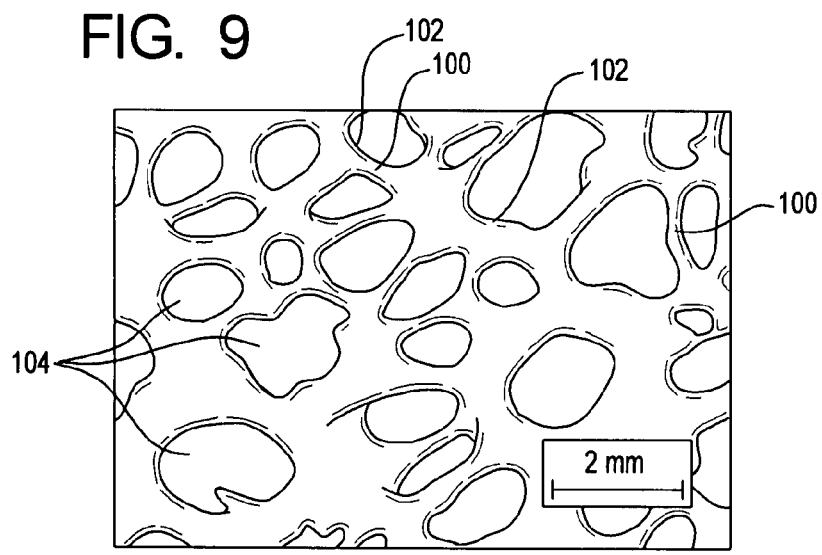
FIG. 9 shows a close up cross sectional view of open cell reticulated foam.

As shown in FIG. 1, the pillow or cushion 20 comprises an outer cover or lining 22 that is in one form a common cotton lining between 0.005" and 0.030" and a filling material 24. The outer cover 22 is preferably a thin breathable material such as a cotton polyester mesh which is commonly employed with pillows. The functional aspect of the lining is to allow air and water vapor to freely pass therethrough. In one form the lining 22 is more open porous material, which facilitates the transfer of air. The central region 23 as shown in FIG. 1 is generally defined as the interior portion of the filler material. In general, the central region 23 is interior portion from the absolute center to the exterior portion 25 which are the foam pieces in close proximity to the lining 22. It should be noted that the 100 open cell reticulated foam allows for free transfer of air therethrough from the interior portion 23 to the exterior portion 25. FIG. 9 is an example of this cross-sectional close-up view of one form of 100% open cell reticulated foam. As illustrated in this figure, the foam pieces are made up of the 100% open cell reticulated foam which is comprised of reticulated structure members 100 and each have an outer surface 102 that defines open regions 104. It should be noted that the reticulation process to make 100% open cell reticulated foam is such that the open regions 104 between the reticulated structure members 100 to remain open without a thin barrier film such as that in close cell foam. This allows for a high throughput of air to the open regions 104 to mitigate bacterial growth, promoting air transfer therethrough and not allowing trapped air or liquid within the foam cell structure.

In the preferred form, the filling material is comprised from foam pieces which are small pieces of 100% open cell reticulated foam. The advantages of using 100% open cell foam are discussed in detail below. In one form, the dimensions of the foam pieces are approximately one quarter of an inch to one half of an inch in lateral width and one half of an inch to 2 inches length while having a height of 1/32 of an inch up to one quarter of an inch. A more preferred form of the foam pieces is approximately one quarter to one half inches lateral width and 0.5 to 1.5 inches length at approximately 1/8 to 3/16 thickness.

Figure 2:
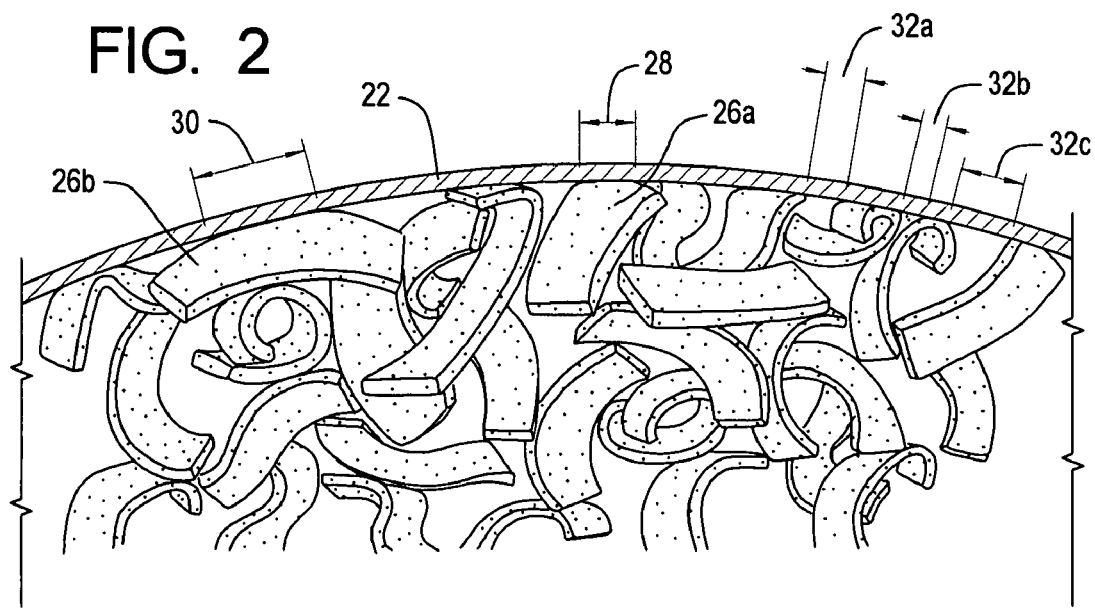
FIG. 2 is a sectional view of a close-up of a partial cross-sectional area of the lining and illustrating the filling material contained therein.

By having relatively small and relatively thin foam pieces comprising the filling material 24, the moment of inertia of each piece is quite low whereby applying beam theory to each individual piece any moment about a piece will produce a bending and twisting action. Further, the individual foam pieces have corners and edges that are not resilient individually to compression such as the touch of the person. The touch of the person is generally soft flesh which imparts a very low pressure upon the foam pieces and human flesh is generally formable and non-rigid and sensitive to localized pressures. As shown in FIG. 2, there is a partial sectional view of a portion of a pillow or cushion where the lining 22 is adjacent to a plurality of foam pieces 26 which comprise the filling material 24. As shown in this figure, the foam pieces 26 are distorted and twisted whereby no single portion of the foam creates a protruding element upon the lining 22. For example, as illustrated by dimension 28, the corner of component 26A is collapsed to a portion having a width as indicated by dimension 28. Further, the foam piece 26B is such that it will have a tendency to bend, exposing a greater surface area as indicated by dimension 30. Therefore, the areas where the foam pieces 26 are not in contact with the lining 22 such as the areas two-dimensionally indicated by dimensions 32A and 32B are minimal. This is advantageous where a greater amount of area provided by the foam pieces 26 is in contact with the lining 22 whereby providing a more consistent surface that is desirable for human touch.

The 100% open cell foam is such that there are substantially no enclosures (even while under compression to a tenth of its volume) that partially block air or encapsulate the air. Whether the 100% open cell foam is classified as a material or as a structure by engineering disciplines, the functional aspect in this particular application is allowing a certain and constant degree of cushioning, rigidity, comfortable tactile surface qualities and breathability.

In an alternative form, the liner 22 can be a double liner 20 where the effective thickness of the breathable liner is doubled (or more than doubled) in order to aid the smoothing out on the tactile feel of the pillow or cushion when there is a human touch placed thereupon. In an alternative form, smaller sized foam components 26 can be strategically positioned on the outer core of the pillow or cushion to provide a more uniform force distribution. Or alternately, there can be an inner shell with larger foam components and in between the inner shell and outer fabric shell would be smaller foam components.

Now referring to FIG. 2, a pressure is applied to the surface 22 as indicated by arrow 34. As indicated in this figure, the elongated flattened shape foam pieces 26 readily deform to expand the surface area that engages the point of pressure. The pressure times the surface area acting upon the lining 22 imparts a force that must be countered among the filling material 24. The foam components 26 counteract this force by providing individual pressures upon surface areas that are in contact with the inner surface of the lining 22. Because the open cell structure of the foam is adapted to readily deform about the corner regions of each individual piece, a greater surface area is provided to be in contact within the lining of the surface 22. This greater surface area allows for less pressure spikes to be experienced along the outer surface of the lining 22. Therefore, a more consistent tactile feel it is experienced when applying pressure to the pillow or cushion 20.

Figure 3:
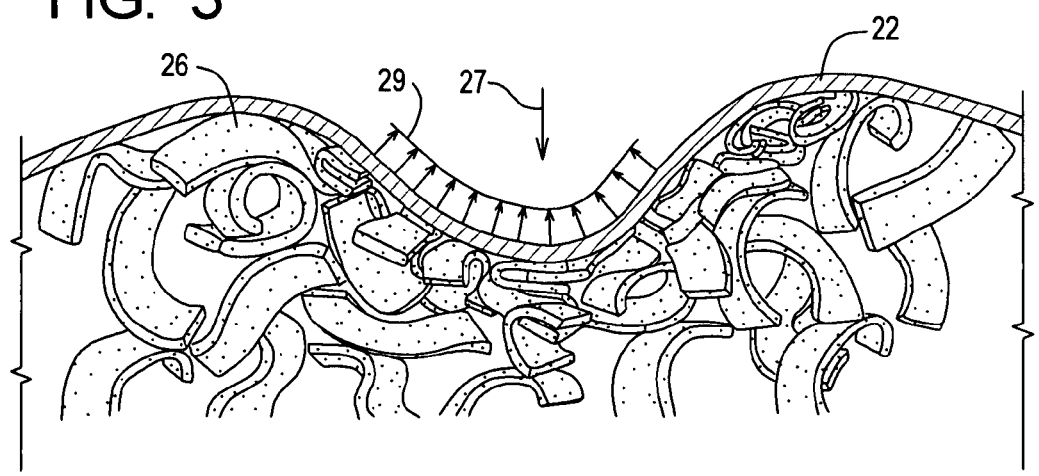
FIG. 3 is an illustration of a force imparted upon the filling material.

As shown in FIG. 3, pressures applied to the liner 22 as indicated by the force vector 27. In general, this force can be imparted by a slight extrusion such as the fold of an ear of the person or other soft or hard tissue of a person. As shown in FIG. 3, the pliable most likely fabric, breathable liner 22 will readily deform and the foam pieces 26 compress to provide a substantially uniform pressure distribution as indicated by the force/pressure distribution grid 29. This is defined as uniform engagement where at least approximately 70% of the exterior surfaces of the foam pieces are in engagement with the skin of the person applying the pressure thereon. In otherwords, the 100% open cell reticulated foam when cut to the dimensions as described herein provides enough residual support to support tissue and skeletal muscular portions of the person; however, it is also flexible enough to provide a distributed pressure distribution on the human surface imparting the force upon the pillow or cushion 20. It should be noted that direct skin contact is not necessary; however, any thin fabric which transfers a force therethrough to the individual is classified as human contact. FIG. 3 shows how the foam pieces 26 will compress together and provide the substantially uniform distribution of surface contact area. Referring back to FIG. 2, the linear air gap spaces indicated by 32A-30C are effectively reduced substantially when a force is applied such as force vector 27 in FIG. 3. The corners and edges of the open cell foam collapse readily to make the substantial equal distribution of force and pressure.

Figure 7:
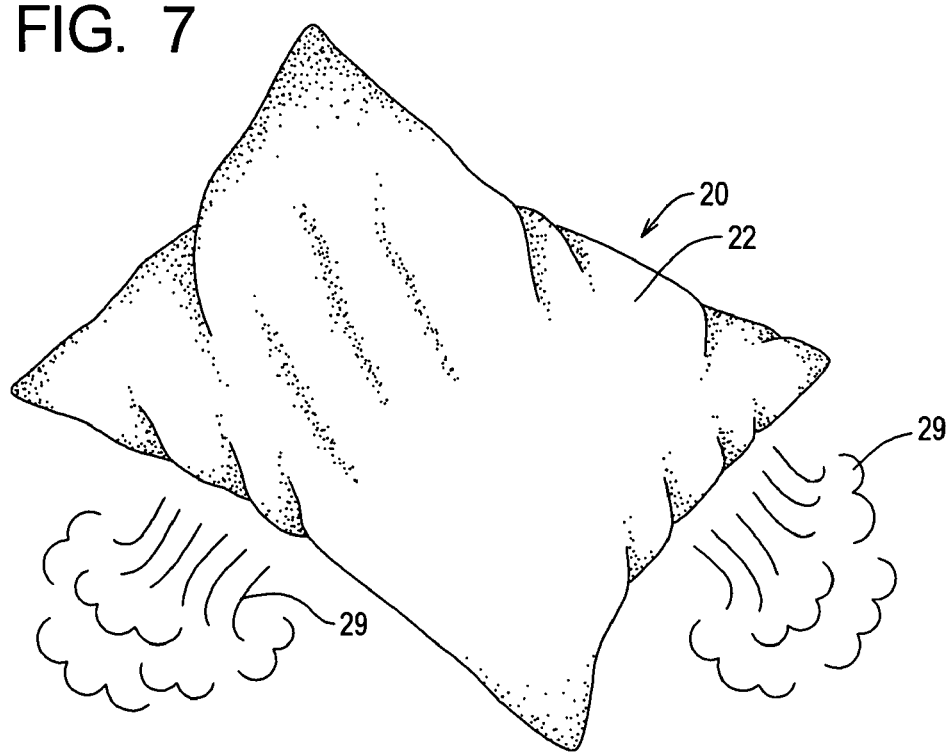
FIG. 7 shows a pillow showing air passing therethrough.
Figure 8:
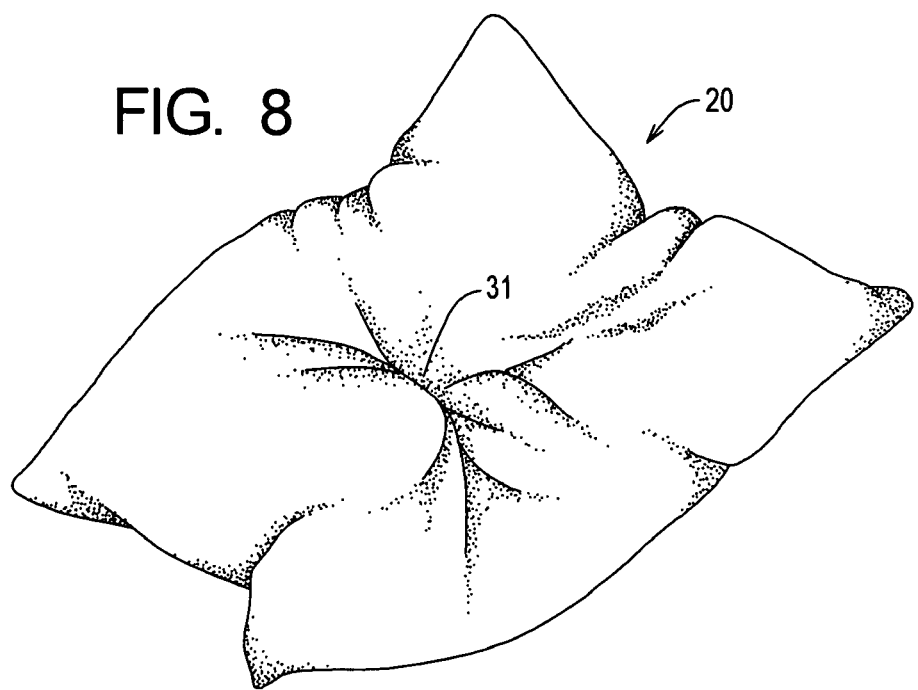
FIG. 8 shows a pillow deformed in a compact position.

As illustrated in FIGS. 7 in 8, the pillow 20 is adapted to have air 29 pass therethrough to the central area and the lining 22. FIG. 8 indicates compression at the central region 31 of the pillow 20 whereby the thin lining which in one form is that is of a common pillow case, is adapted to freely reposition in a crinkled like state.

Figure 4:
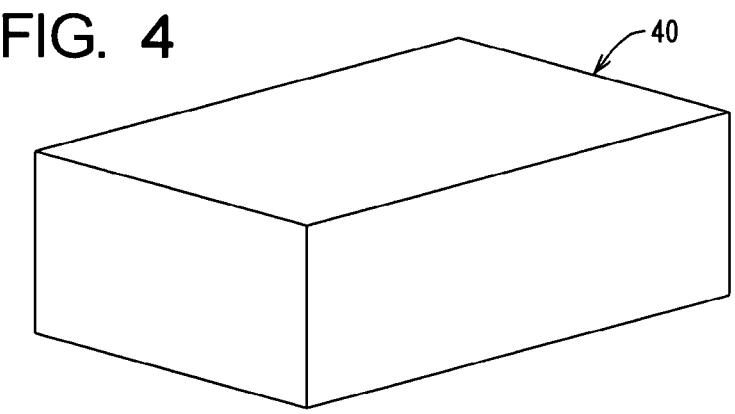
FIG. 4 shows a block of foam beginning a manufacturing process.
Figure 5:
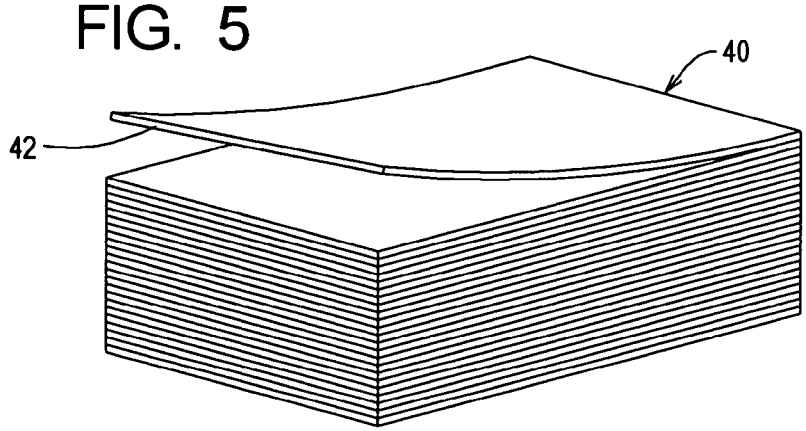
FIG. 5 shows a second step in one form of manufacturing the foam.

There will now be a discussion of a method of manufacturing the filling material 24. In one form, as shown in FIG. 4, a block of foam which in one form is referred to as a bun 40 is retrieved. As shown in FIG. 5, the bun 40 is sliced (skived) into thin sheets 42. The sheets can have a variable thickness. As described above, a preferred thickness is approximately ⅛ of an inch. Another range of thickness is between 1/32nd of an inch up to one fourth of an inch. Of course, if the structural properties of the 100% open cell foam are adjusted then these ranges can vary to accomplish the tactile cushioning of effects as described above and claimed herein. The thickness of the sheet 42 determines the heights of the final foam pieces 26.

Figure 6:
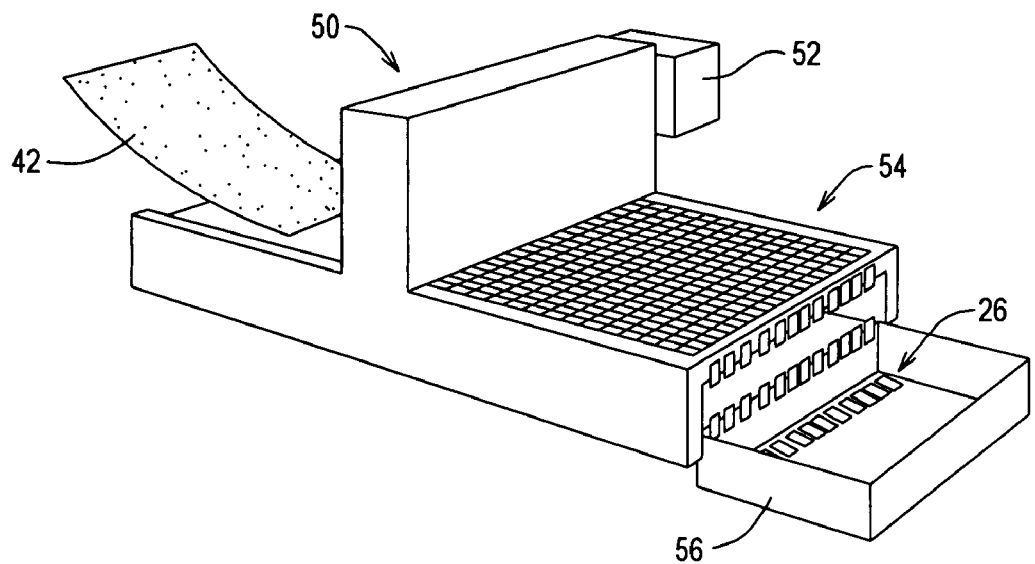
FIG. 6 shows a machine and method of making the foam pieces that comprise the filling material.

Now referring to FIG. 6, the sheets of the bun stock foam are now cut (with scalloped blades or other available methods) into smaller sections for the purpose of die cutting. The preferred size of each sheet is approximately 12"×12" and ⅛" in height as shown in FIG. 7. This size enables them to be easily hand fed into a large hydraulic die press for the final cutting into small pieces. Using a commonly known commercial die press with tens of tons of pressure (85 tons is reasonable), several inches of material (approximately 20 or more sheets at ⅛"ʰ") can be cut simultaneously in the dimensions of 1.125"×0.5". By utilizing this method, approximately one to two board feet of material can be cut per minute. After each compression of the die press machines, the material is hand turned into a retrieving bin for its final insertion into the intended product. The retrieving bin 56 is adapted to recover the foam pieces 26 and feed them to a liner insertion (not shown). In general, a liner insertion retrieves an enclosure such as the liner 22 as shown in FIG. 1 and disperses the material 24 therein. In a preferred form, the filling material is randomly dispersed within the liner in a manner as shown in FIGS. 2 and 3 above. Of course other methods can be employed to construct the filling material 24. Further, an offset rotary die member having lengths that are alternating between a first length and a second length (for example, 1 in. and 1.4 in.) can be employed where it is desirable to have a mixture of various length foam members 26 contained in the liner 22. The density of the filling material can be between 0.8-2.0 pounds/cubic foot. A preferred density is approximately 1.2-1.75 pounds/cubic foot and in one form approximately 1.4 pounds/cubic foot because this density provides a medium rigid structure of the open cell material providing additional flexibility of the individual foam components 26.

Figure 6A:
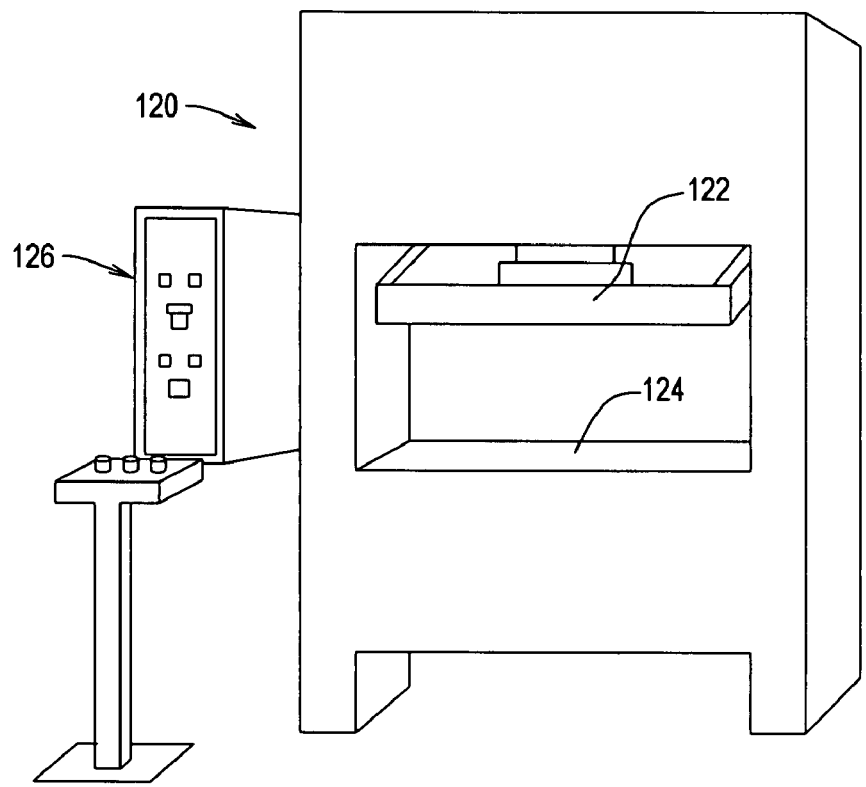
FIG. 6A shows an isometric view of another machine that is adapted to make the foam pieces.
Figure 10:
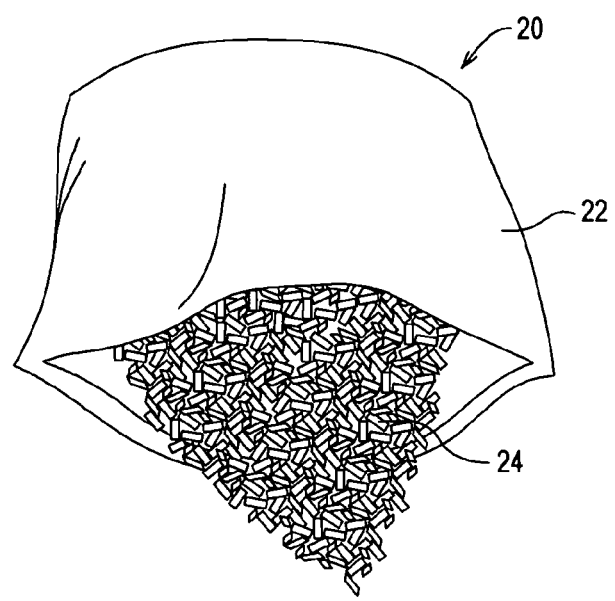
FIG. 10 shows a pillow with the front portion open with the filler material being inserted to the central chamber region of the pillow.

FIG. 6A shows another method of making the foam whereby the apparatus 120 comprises a compression die 122 that is adapted to engage the lower engagement surface 124 where interposed chunks of foam are incised by the die to make the width and lengthwise cuts. The pieces of interposed foam are cut the desired thickness which as described above is generally relatively thin as compared to the width and lengthwise dimensions. The apparatus 120 as a control interface 126 is adapted to control the operations of the apparatus. After the filler material is properly cut, the pillow casing/liner as shown in FIG. 10 is filled with the filling material 24.

Regarding manufacturing, a blower of sorts can fill the fabric shells 22. In one form, the blower can be set to discharge a certain volume (or weight) of foam into a fixed size shell casing. In high end production, instead of starting with the bun as shown in FIG. 4, the foam can be produced in rolls that are at at a desired thickness as the thickness of the foam components, or alternately could be set at a thickness that is a multiple of the final foam thickness whereby the rolls are dynamically cut before feeding to the cutting machine such as shown in FIG. 6 as machine 50. It should be further noted that the 100% open cell reticulated foam stands up to repetitive deformation whereby the foam structure will not stay matted down, but rather rebound to its original volume and shape. This is particularly useful with a pillow that undergoes many cycles of compression and expansion. The foam is further resistant to chemical erosion.

Regarding the size of the foam feathers (or pieces), if the pieces are made too small, the foam can lose its open cell structure and may become ineffective for warmth and dampness to freely filter out. If the pieces were made too large (such as one inch cubes), they would be obtrusive to the touch when used for a bed pillow with a thin cover. Whatever the embodiment of the method chosen by those skilled in the art of this development, the invention's intended purpose is to create a filling material of small pieces (using 100% open cell reticulated polyurethane foam) that will filter out the warm and damp condition, while giving a product (such as pillows) a longer lasting sanitary life.

The small pieces of reticulated 100% open cell polyurethane foam will retain their resiliency longer than regular polyurethane foam or synthetic fibers. These small pieces become the necessary means for the flexibility required for comfort, together with the ability to filter out the warm and damp condition in the filling material. Because the intended use of the invention is for products with close contact to the human body, the smaller pieces will possess a better tactile feel and are preferred. As long as the final invention continues to remain a 100% open celled filling material, the intent of the product is fulfilled.

Figure 11:
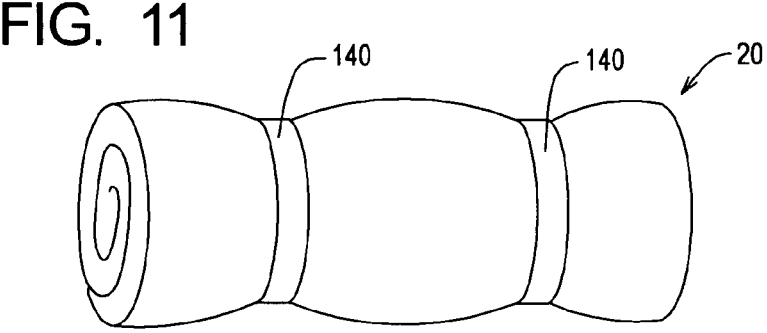
FIG. 11 shows the pillow in a rolled up stored position state.

As indicated in FIG. 11, the pillow 20 is well suited to be stored in a compressed state whereby the straps 140 can be a part of the lining and sewed thereto and supply a compressive pressure around the pillow 20 so it is sufficiently compact for travel or general storage. The filling material is particularly conducive to being stored in a compressed state and returning to its original volume and not loosing the characteristics described above in FIGS. 2 and 3.

Of course various modifications and alterations can be performed without departing from the spirit and scope of the claimed invention.

We claim:

1. A filler material of discrete randomly placed open celled reticulated polyurethane foam pieces for use in pillows adapted to support a person who applies pressure to the filler material, the filler material comprising a plurality of reticulated 100% open cell structured foam pieces having a reticulated structure and an elongated flattened shape having an outer surface defining open regions and the pieces are of a size from approximately 1/16 to ¼ inches thick by ⅛ to ¾ inch wide by 1 to 2 inches long, the cross sectional area having sufficient flex to allow the foam piece to flexibly bend under pressure applied by a portion of the person, the foam pieces having a yield strength sufficient to enable the foam pieces to repeatedly reposition back to their original shape after removal of pressure applied by a portion of the person, wherein the filler material is adapted to let air freely pass therethrough with no obstruction between the reticulated structure members from the center region of the filler material to the exterior portion of the filler material.

2. The filler material as recited in claim 1 wherein the foam pieces have a size from approximately ¼ inch thick by ½ inches wide by 1 to 2 inches long and approximately ⅛ inch in height.

3. The filler material as recited in claim 1 wherein the foam pieces have a void volume of at least 97%.

4. The filler material as recited in claim 1 wherein the foam pieces continue to have a surface defining a void volume of over 90% while under compression to ⅓rd of the original volumes size adapted to allow air to pass therethrough.

5. The filler material as recited in claim 1 wherein the density of the filler material is between 0.8 pcf and 2.80 pcf.

6. The filler material as recited in claim 3, wherein air can readily pass through surface defining a void volume of 97% and remove unwanted heat and moisture from within the filler material.

7. The filler material as recited in claim 4, wherein air can readily pass though the void volume and remove unwanted heat and moisture from within the filler material.

8. The filler material as recited in claim 1 wherein said foam pieces have gross density between 0.8-2.0 pounds/cubic foot that is adapted to allow filtering out of warm and damp air within the pillow, while providing adequate support for the portion of the human body.

9. A pillow having a thin breathable lining between 0.005" and 0.030", filler material of discrete randomly placed open cell reticulated polyurethane foam pieces for use in pillows adapted to support a person who applies pressure to the filler material, the filler material comprising a plurality of reticulated 100% open cell structured foam pieces having a reticulated structure and an elongated flattened shape each having an outer surface defining open regions at a size from approximately 1/16 to ¼ inches thick by ⅛ to ¾ inch wide by 1 to 2 inches long, the cross sectional area having sufficient flex to allow the foam piece to flexibly bend under pressure applied by a portion of the person, the foam pieces having a yield strength sufficient to enable the foam pieces to repeatedly reposition back to their original shape after removal of pressure applied by a portion of the person, whereas the filler material is adapted to let air freely pass therethrough with no obstruction between the reticulated structure members from the center region of the filler material to the exterior portion of the filler material and the pillow is adapted to have a uniform engagement of the filler material to the lining when pressure from the person is placed thereon.

* * * * *